US012097849B2

(12) United States Patent
Yang

(10) Patent No.: US 12,097,849 B2
(45) Date of Patent: Sep. 24, 2024

(54) SYSTEM FOR PREDICTING COLLISION RISK IN LANE CHANGE DECISION, BASED ON RADAR SENSOR, AND METHOD FOR THE SAME

(71) Applicant: HYUNDAI MOBIS CO., LTD., Seoul (KR)

(72) Inventor: Jin Ho Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 531 days.

(21) Appl. No.: 17/407,539

(22) Filed: Aug. 20, 2021

(65) Prior Publication Data

US 2022/0055619 A1 Feb. 24, 2022

(30) Foreign Application Priority Data

Aug. 24, 2020 (KR) .................. 10-2020-0106437

(51) Int. Cl.
*B60W 30/18* (2012.01)
*B60W 30/09* (2012.01)
*B60W 30/095* (2012.01)

(52) U.S. Cl.
CPC ........ *B60W 30/0956* (2013.01); *B60W 30/09* (2013.01); *B60W 30/18163* (2013.01);
(Continued)

(58) Field of Classification Search
CPC ............. B60W 30/0956; B60W 30/09; B60W 30/18163; B60W 2420/408;
(Continued)

(56) References Cited

U.S. PATENT DOCUMENTS

| 10,259,459 B2* | 4/2019 | Takae ..................... G08G 1/167 |
| 2010/0228419 A1* | 9/2010 | Lee ................... B60W 30/0956 |
| | | 701/25 |

(Continued)

FOREIGN PATENT DOCUMENTS

| CN | 108275155 A | 7/2018 |
| CN | 110040139 A | 7/2019 |

(Continued)

OTHER PUBLICATIONS

Extended European Search Report issued in corresponding European Patent Application No. 21191348.8 dated Jan. 24, 2022.
Office Action issued in corresponding Chinese Patent Application No. 202110970853.8 dated May 25, 2023, with English translation.

*Primary Examiner* — Daniel M. Robert
(74) *Attorney, Agent, or Firm* — MORGAN, LEWIS & BOCKIUS LLP

(57) ABSTRACT

A system for predicting a collision risk in lane change decision based on a radar sensor, includes radar sensors disposed at a front portion and a rear portion of a host vehicle to recognize a forward vehicle positioned at a front-side portion of the host vehicle and a rearward vehicle positioned at a rear-side portion of the host vehicle, respectively, and a moving controller configured to determine that the host vehicle is able to change a lane, when a position of a counterpart vehicle, which is measured through the radar sensor, is not included in a section of the local map, and when a relative acceleration of the counterpart vehicle is maintained in an allowance range for a specific time.

11 Claims, 6 Drawing Sheets

(52) U.S. Cl.
CPC ............... *B60W 2420/408* (2024.01); *B60W 2530/201* (2020.02); *B60W 2552/00* (2020.02); *B60W 2552/10* (2020.02); *B60W 2554/4041* (2020.02); *B60W 2554/802* (2020.02); *B60W 2554/804* (2020.02)

(58) Field of Classification Search
CPC ....... B60W 2530/201; B60W 2552/00; B60W 2552/10; B60W 2554/4041; B60Y 2554/802; B60W 2554/804; B60W 2420/403; B60W 10/20; B60W 2520/10; B60W 2540/30; B60W 2554/805; B60W 50/0097; B60W 2050/143; B60W 50/14; B60W 2540/18; B60W 2554/4042; B60W 2554/803; B60W 2554/801; B60W 2710/202; B60W 60/0015; B60W 30/08; B60W 30/181; B60W 40/02; B60W 2520/04; B60W 2520/06; B60W 2554/80; G01S 13/931; G08G 1/167; B60Y 2300/18091; B60Y 2300/18166
See application file for complete search history.

(56) References Cited

U.S. PATENT DOCUMENTS

| | | | |
|---|---|---|---|
| 2018/0050673 A1* | 2/2018 | D'Sa | B60T 8/58 |
| 2018/0178802 A1 | 6/2018 | Miyata | |
| 2018/0188735 A1* | 7/2018 | Sugawara | B62D 15/0255 |
| 2018/0251129 A1* | 9/2018 | Ji | B60W 30/18163 |
| 2018/0354510 A1* | 12/2018 | Miyata | B60W 30/18163 |
| 2019/0016338 A1* | 1/2019 | Ishioka | B60W 30/18163 |
| 2021/0094575 A1* | 4/2021 | Sato | B60W 30/16 |
| 2021/0261133 A1* | 8/2021 | Sakayori | B60W 30/18163 |
| 2022/0055619 A1* | 2/2022 | Yang | B60W 30/18163 |

FOREIGN PATENT DOCUMENTS

| | | | |
|---|---|---|---|
| CN | 110239531 A | | 9/2019 |
| CN | 111409639 A | | 7/2020 |
| DE | 102017209736 A1 | * | 12/2018 |
| EP | 3 330 941 A1 | | 6/2018 |
| KR | 10-2019-0125013 A | | 11/2019 |
| WO | WO-2018100164 A1 | * | 6/2018 |

* cited by examiner

SYSTEM FOR PREDICTING COLLISION RISK IN LANE CHANGE DECISION, BASED ON RADAR SENSOR, AND METHOD FOR THE SAME

CROSS-REFERENCE TO RELATED APPLICATION

This application claims the benefit of priority to Korean Patent Application No 10-2020-0106437, filed in the Korean Intellectual Property Office on Aug. 24, 2020, the entire contents of which are incorporated herein by reference.

TECHNICAL FIELD

The present disclosure relates to a system for predicting a collision risk in lane change decision based on a radar sensor, and a method for the same, and more particularly relates to a system for predicting a collision risk in lane change based on a radar sensor, capable of preventing the collision risk by predicting a future behavior using a relative distance or a relative speed with respect to a vehicle, which is positioned at a front-side portion or a rear-side portion inside a target lane, right before a host vehicle changes a lane and a method thereof.

BACKGROUND

In general, an advanced driver assistance system (ADAS) is a system allowing a vehicle to self-recognize some of numerous situations to be happened during travelling, and to determine the situation to control actuators.

Such ADAS largely reduces the driving burden of a driver during driving by integrally employing an adaptive cruise control (ACC) to select a forward vehicle as a control target based on vehicle detection information sensed by a sensor and to automatically control a driving speed and a following distance by controlling acceleration/deceleration, and a lane keep assist system (LKAS) to assist lane keeping by adjusting a driving direction, and navigation information (map data; global positioning system (GPS)).

Recently, the interest in an autonomous driving technology of a vehicle has been increased. The unmanned autonomous driving technology refers to a technology of allowing the vehicle to automatically drive without involving a driver.

When a lane is changed in the autonomous driving, movement (relative distance; relative speed) with respect to surrounding vehicles is detected by distance measurement sensors such as a Radar or LiDar, and whether the lane is changed is determined based on the information.

In other words, when a command of changing the lane is triggered, the movement of the surrounding vehicles is calculated to determine whether to change the lane to a next lane, which is defined as a process of determining lane change risk.

In this case, the lane change risk may be determined by calculating time-to-collision (TTC) based on relative movement to a target vehicle, to which the determination of the lane change risk is applied, or by predicting a future track based on information on the behavior of a host vehicle through an in-vehicle sensor, such as a high-precision positioning sensor and an inertial measurement sensor, on the assumption that the movement (based on a speed or an acceleration) of the surrounding vehicles at a current time point may be similarly made in the future.

However, since a conventional TTC may be varied depending on the behavior of a surrounding vehicle, the conventional TTC may be inappropriate when used as a value for consecutive monitor or determination. The high-precision positioning sensor, a Lidar, or a vehicle communication module has a high price and is significantly restricted in the operating environment requiring higher reliability.

SUMMARY

The present disclosure has been made to solve the above-mentioned problems occurring in the prior art while advantages achieved by the prior art are maintained intact An aspect of the present disclosure provides a system for predicting a collision risk in lane change decision based on a radar sensor and a method for the same, capable of preventing the collision risk by predicting a future behavior using information on a relative distance or a relative speed with respect to a vehicle, which is positioned at a front-side portion or a rear-side portion inside a target lane, right before a host vehicle changes a lane. In addition, an accident risk may be reduced in lane change such that a lane is safely changed, by using a front radar or rear-side radar conventionally mounted, without developing an additional sensor or hardware.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for predicting a collision risk in lane change based on a radar sensor, may include radar sensors disposed at a front portion and a rear portion of a host vehicle and configured to recognize a forward vehicle positioned at a front-side portion of the host vehicle and a rearward vehicle positioned at a rear-side portion of the host vehicle, respectively, and a moving controller to form a local map to maintain a specific distance left, right, forward, and rearward from the host vehicle, and to determine that the host vehicle is able to change a lane, when a position of the forward vehicle or a position of the rearward vehicle is absent in a section of the local map, or when the position of the forward vehicle or the rearward vehicle is predicted as being absent in the section of the local map after a specific time is elapsed, based on a speed of the forward vehicle or a speed of the rearward vehicle, even though the position of the forward vehicle or the position of the rearward vehicle is included in the section of the local map.

According to an embodiment, radar sensors may be disposed at a front portion, a rear-left portion, and a rear-right portion of the host vehicle, respectively.

According to an embodiment, the local map may include, in a forward direction of the host vehicle, a forward-traveling lane section corresponding to a width of a lane on which the host vehicle travels forward, a left lane section corresponding to a width of a left lane positioned at a left side of the forward-traveling lane section, and a right lane section corresponding to a width of a right lane positioned at a right side of the forward-traveling lane section, and may include, in a direction perpendicular to the forward direction of the host vehicle, a host vehicle section corresponding to a total length of the host vehicle, a front allowance section extending forward from the host vehicle section, and a rear allowance section extending rearward from the host vehicle section.

According to an embodiment, the front allowance section may be a minimum stop distance for allowing the host vehicle to stop without collision, when the forward vehicle is braked at a maximum deceleration, and the rear allowance section may be a distance from the host vehicle, as the rearward vehicle is decelerated According to an embodiment, the local map may include a front margin section varied depending on a driver characteristic and formed between the host vehicle section and the front allowance section, and a rear margin section varied depending on the driver characteristic and formed between the host vehicle section and the rear allowance section.

According to an embodiment, the moving controller may determine that the host vehicle is able to change the lane when an absolute value of a relative distance with respect to the forward vehicle is greater than a sum of a length of the front margin section and a length of the front allowance section.

According to an embodiment, the moving controller may determine that the host vehicle is able to change the lane, when an absolute value of a relative distance with respect to the forward vehicle is equal to or less than a sum of a length of the front margin section and a length of the front allowance section, but when the absolute value of the relative distance with respect to the forward vehicle is predicted as being greater than the sum of the length of the front margin section and the length of the front allowance section after a specific time is elapsed, as a relative speed with respect to the forward vehicle is positive or a relative acceleration of the forward vehicle is measured positive even if a relative speed with respect to the forward vehicle is negative.

According to an embodiment, the moving controller may determine that the host vehicle is able to change the lane, when an absolute value of a relative distance with respect to the rearward vehicle is greater than a sum of a length of the rear margin section and a length of the rear allowance section.

According to an embodiment, the moving controller may determine that the host vehicle is able to change the lane, when an absolute value of a relative distance with respect to the rearward vehicle is equal to or less than a sum of a length of the rear margin section and a length of the rear allowance section, but when the absolute value of the relative distance with respect to the rearward vehicle is predicted as being greater than the sum of the length of the rear margin section and the length of the rear allowance section after a specific time is elapsed, as the relative speed with respect to the forward vehicle is negative or a relative acceleration with respect to the rearward vehicle is measured negative, even if the relative speed with respect to the forward vehicle or positive.

According to another embodiment of the present disclosure, a method for predicting a collision risk in lane change based on a radar sensor includes a local step of forming, by a moving controller, a local map to maintain a specific distance left, right, forward, and rearward from a host vehicle, a sensing step of sensing a relative speed and a relative distance with respect to a forward vehicle positioned at a front-side portion of the host vehicle, and a relative speed and a relative distance with respect to a rearward vehicle positioned at a rear-side portion of the host vehicle, through radar sensors disposed at a front portion and a rear portion of the host vehicle, and a changing step of determining, by the moving controller, that the host vehicle is able to change a lane, when a position of the forward vehicle or a position of the rearward vehicle is absent in a section of the local map, or when the position of the forward vehicle or the position the rearward vehicle is predicted as being absent in the section of the local map after a specific time is elapsed, based on a speed of the forward vehicle or a speed of the rearward vehicle, even though the position of the forward vehicle or the position of the rearward vehicle is present in the section of the local map.

According to an embodiment, the local step may include the step of forming, in a forward direction of the host vehicle, a forward-traveling lane section corresponding to a width of a lane on which the host vehicle travels forward, a left lane section corresponding to a width of a left lane positioned at a left side of the forward-traveling lane section, and a right lane section corresponding to a width of a right lane positioned at a right side of the forward-traveling lane section, and the step of forming, in a direction perpendicular to the forward direction of the host vehicle, a host vehicle section corresponding to a total length of the host vehicle, a front allowance section extending forward from the host vehicle section and indicating a minimum stop distance for allowing the host vehicle to stop without collision, when the forward vehicle is braked at a maximum deceleration, and a rear allowance section extending rearward from the host vehicle section and indicating a distance from the host vehicle, as the rearward vehicle is decelerated.

According to an embodiment, the local step may include the step of forming a front margin section varied depending on a driver characteristic and formed between the host vehicle section and the front allowance section, and a rear margin section varied depending on the driver characteristic and formed between the host vehicle section and the rear allowance section.

According to an embodiment, the changing step may include the step of determining that the host vehicle is able to change the lane when an absolute value of a relative distance with respect to the forward vehicle is greater than a sum of a length of the front margin section and a length of the front allowance section.

According to an embodiment, the changing step may include the step of determining that the host vehicle is able to change the lane, when an absolute value of a relative distance with respect to the forward vehicle is equal to or less than a sum of a length of the front margin section and a length of the front allowance section, but when the absolute value of the relative distance with respect to the forward vehicle is predicted as being greater than the sum of the length of the front margin section and the length of the front allowance section after a specific time is elapsed, as a relative speed with respect to the forward vehicle is positive or a relative acceleration of the forward vehicle is measured positive, even if the relative speed with respect to the forward vehicle is negative.

According to an embodiment, the changing step may include the step of determining that the host vehicle is able to change the lane, when an absolute value of a relative distance with respect to the rearward vehicle is greater than a sum of a length of the rear margin section and a length of the rear allowance section.

According to an embodiment, the changing step may include the step of determining that the host vehicle is able to change the lane, when an absolute value of a relative distance with respect to the rearward vehicle is equal to or less than a sum of a length of the rear margin section and a length of the rear allowance section, but when the absolute value of the relative distance with respect to the rearward vehicle is predicted as being greater than the sum of the length of the rear margin section and the length of the rear allowance section after a specific time is elapsed, as a relative speed with respect to the forward vehicle is negative or a relative acceleration with respect to the rearward vehicle is measured negative, even if the relative speed with respect to the forward vehicle is positive.

According to the present disclosure, the collision risk may be prevented by predicting the future behavior using information on the relative distance or the relative speed with respect to the vehicle, which is positioned at the front-side portion or the rear-side portion inside the target lane, right before a host vehicle changes a lane. In addition, the accident risk may be reduced in lane change such that the lane is safely changed, by using a front radar or rear-side radar conventionally mounted, without developing an additional sensor or hardware.

Besides, a variety of effects directly or indirectly understood through the disclosure may be provided.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
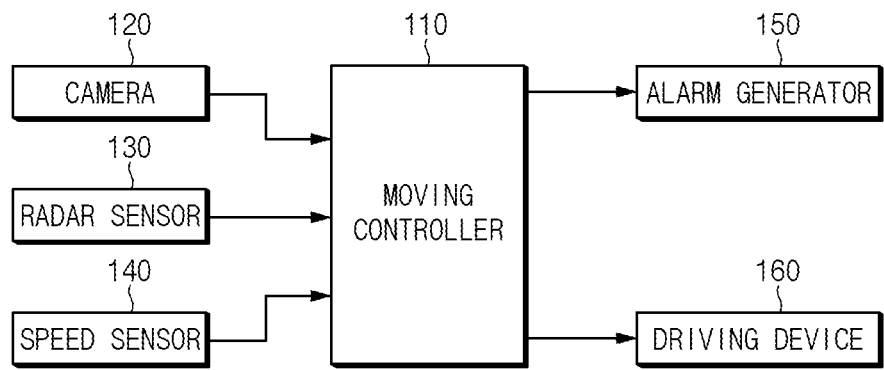
FIG. 1 is a block diagram illustrating a system for predicting a collision risk in lane change based on a radar sensor, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", "(a)", "(b)", and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 5.

Figure 2:
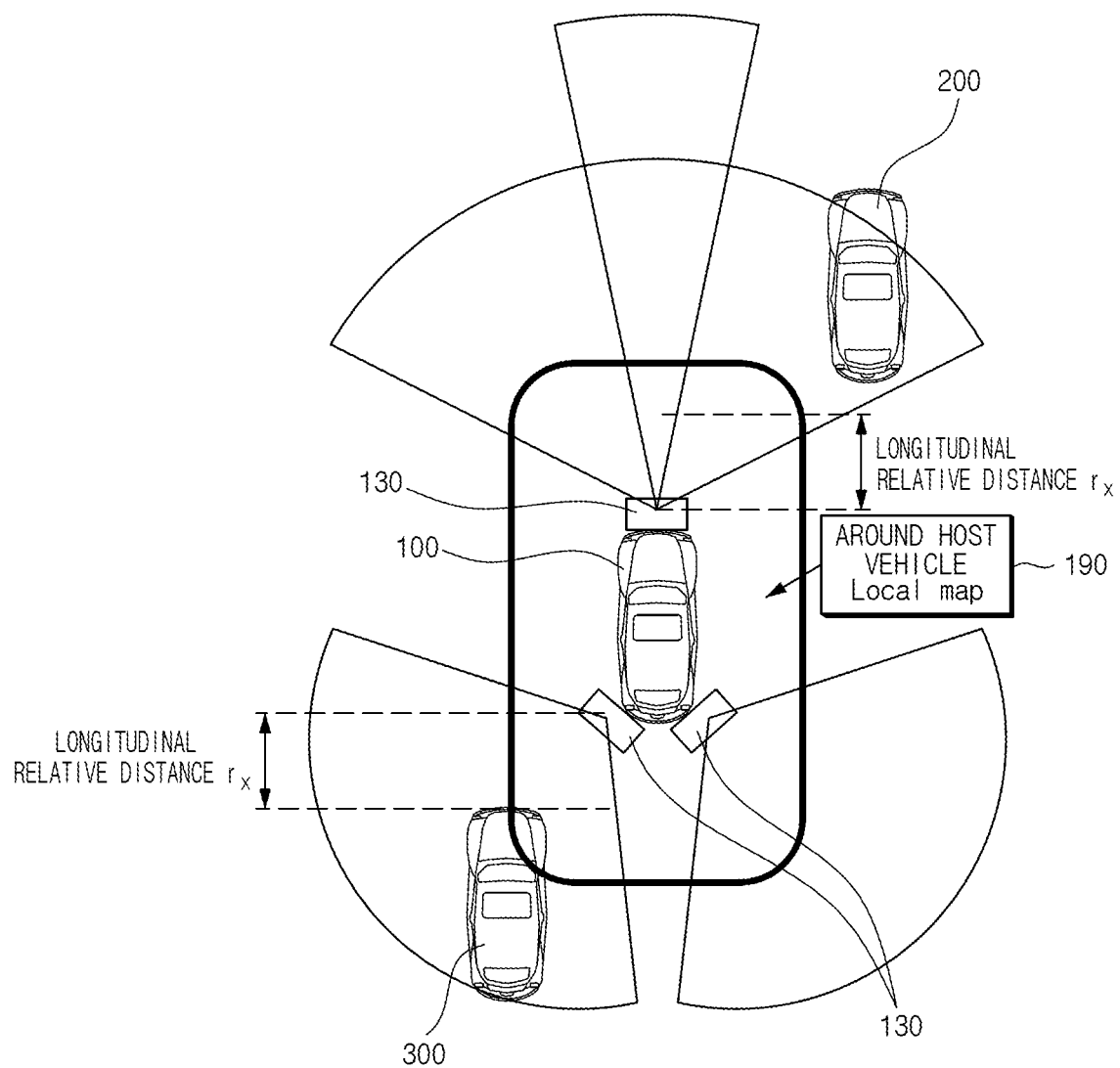
FIG. 2 is a view illustrating a side vehicle sensed, in a system for predicting a collision risk in lane change based on a radar sensor, according to an embodiment of the present disclosure.
Figure 3:
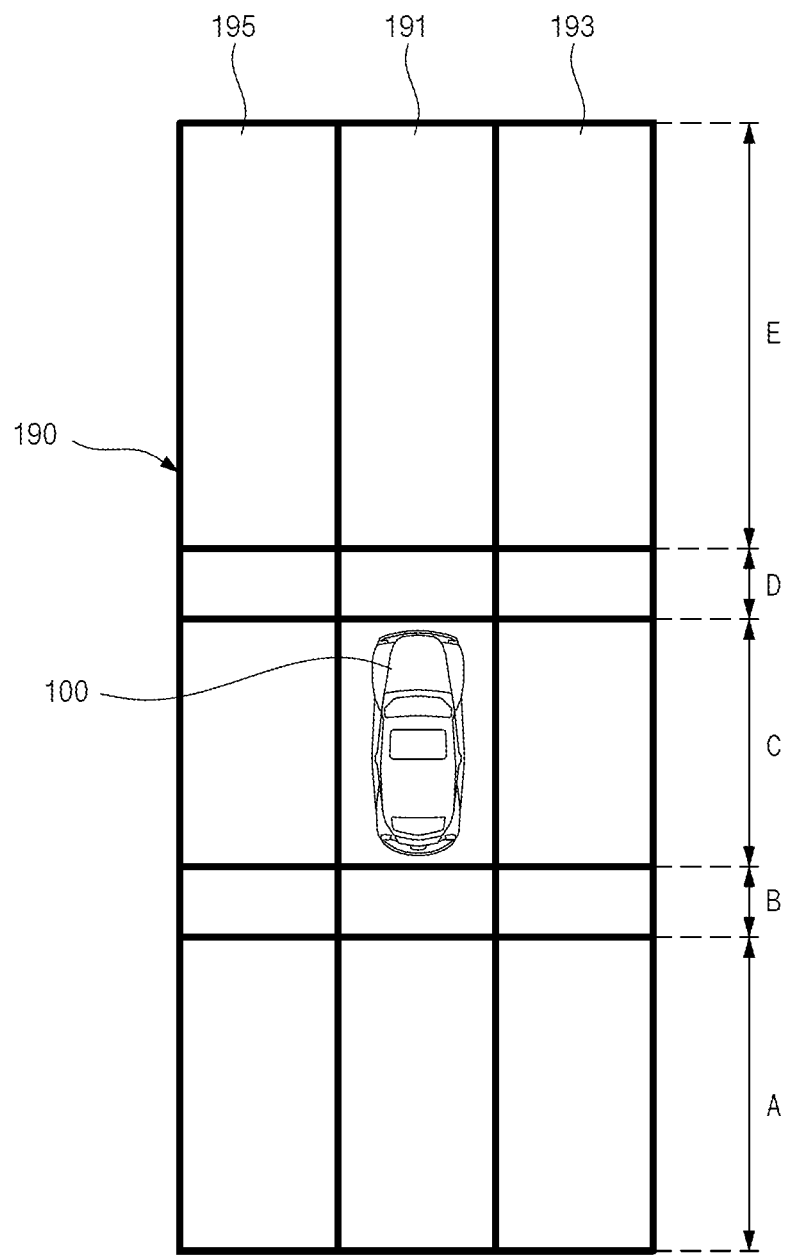
FIG. 3 is a view illustrating a local map used in a system for predicting a collision risk in lane change based on a radar sensor, according to an embodiment of the present disclosure.
Figure 4:
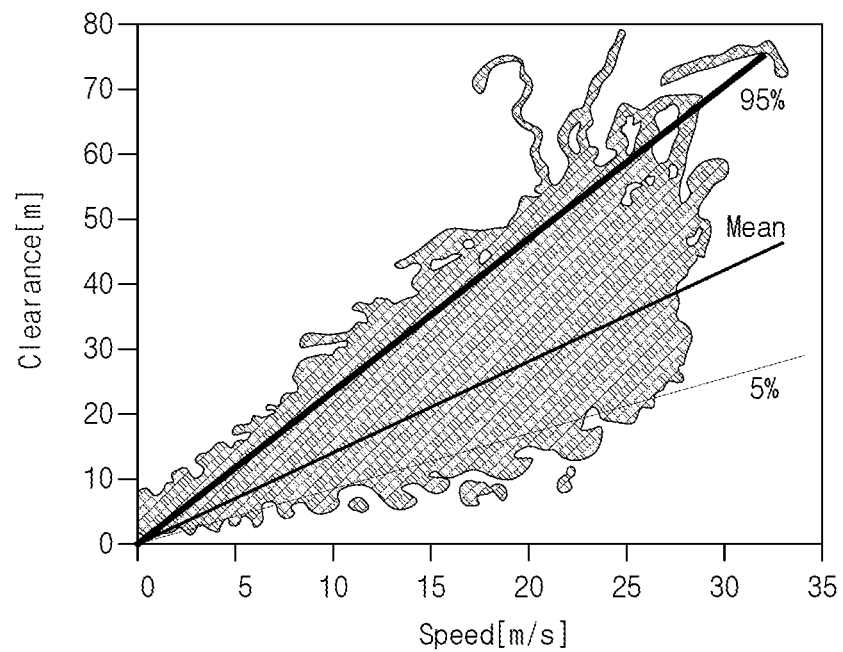
FIGS. 4 and 5 are graphs illustrating driver characteristic data applied to a system for predicting a collision risk in lane change based on a radar sensor, according to an embodiment of the present disclosure.
Figure 5:
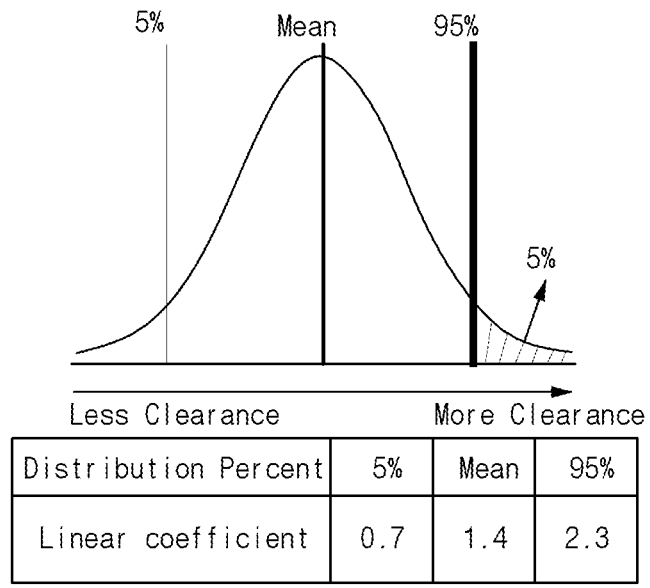

FIG. 1 is a block diagram illustrating a system for predicting a collision risk in lane change based on a radar sensor, according to an embodiment of the present disclosure, FIG. 2 is a view illustrating a side vehicle sensed, in a system for predicting a collision risk in lane change based on a radar sensor, according to an embodiment of the present disclosure, and FIG. 3 is a view illustrating a local map used in a system for predicting a collision risk in lane change based on a radar sensor, according to an embodiment of the present disclosure. FIGS. 4 and 5 are graphs illustrating driver characteristic data applied to a system for predicting a collision risk in lane change based on a radar sensor, according to an embodiment of the present disclosure.

Referring to FIGS. 1 and 2, according to an embodiment of the present disclosure, a system for predicting a collision risk in lane change based on a radar sensor may include a camera 120, a radar sensor 130, a speed sensor 140, a moving controller 110, an alarm generator 150, and a driver 160

The camera 120 may be installed at an upper portion of a host vehicle 100 to photograph a lane in front of the host vehicle 100.

Radar sensors 130 may be provided at a front portion, a rear-left portion, and a rear-right portion of the host vehicle 100, may recognize a forward vehicle 200 positioned at the front-side portion of the host vehicle 100 or a rearward vehicle 300 positioned at the rear-side portion of the host vehicle 100, and may sense the relative distance and the relative speed between the host vehicle 100 and the forward vehicle 200, or the relative distance and the relative speed between the host vehicle 100 and the rearward vehicle 300.

The speed sensor 140 may sense the speed of the host vehicle 100 which is currently traveling.

The moving controller 110 may recognize a lane in front of the host vehicle 100, based on image data captured by the camera 120 and may form a local map 190. The moving controller 110 may calculate a relative distance, a relative speed, and a direction angle with respect to the forward vehicle 200 or the rearward vehicle 300, which are sensed by the radar sensor 130, and may calculate a longitudinal relative acceleration ($a_x'$) through a state estimate technique, based on a longitudinal relative distance ($r_x$) or a longitudinal relative speed ($v_x'$) of data.

The local map 190 shows spaces formed to maintain a specific distance left, right, forward, or rearward from the host vehicle 100 such that the host vehicle 100 determines a collision risk with respect to the forward vehicle 200 or the rearward vehicle 300, before changing a lane.

Referring to FIG. 3, in the local map 190, a horizontal line, which extends in a direction perpendicular to a forward direction of the host vehicle 100, may have the width which is the sum of the width of a central lane and the widths of lanes at both sides of the central lane. The horizontal line may include a forward-traveling lane section 191 corresponding to the width of the lane on which the host vehicle 100 travels forward, a left lane section 195 corresponding to the width of a left lane positioned at the left side of the forward-traveling lane section 191, and a right lane section 193 corresponding to the width of a right lane positioned at the right side of the forward-traveling lane section 191.

In the local map 190, a vertical line, which extends in a direction parallel to the forward direction of the host vehicle 100, may be determined through a function of the relative distance and the relative speed between the host vehicle 100 and the forward vehicle 200 or the rearward vehicle 300. The vertical line may include a host vehicle section "C" corresponding to the total length of the host vehicle 100, a front allowance section "E" extending forward from the host vehicle section "C", and a rear allowance section "A" extending rearward from the host vehicle section "C".

Although the host vehicle section "C" may have various total lengths depending on the types of the host vehicle 100, the host vehicle section "C" may be provided as a fixed value depending on the total length of the host vehicle 100.

The front allowance section "E" may be the minimum stop distance for allowing the host vehicle 100 to stop without collision, when the forward vehicle 200 positioned at the front-side portion of the host vehicle 100 is braked at the maximum deceleration, and may be determined through Equation 1.

$$\left(t_d - \frac{V_X^r}{2*a_e}\right)*V_X^r \qquad \text{Equation 1}$$

In Equation 1, "$a_e$" is the maximum deceleration during sudden braking, and "$t_d$" is the delay time.

In this case, when the relative speed ($V_x^r$) of the forward vehicle 200 is positive, since the relative distance between the forward vehicle 200 and the host vehicle 100 is longer, the host vehicle 100 may safely change the lane. In this case, the relative speed ($V_x^r$) may not be considered in determining the front allowance section "E"

Accordingly, to determine the front allowance section "E", the relative speed ($V_x^r$) with respect to the host vehicle 100 may be considered only when the relative speed ($V_x^r$) is negative, which indicates that the host vehicle 100 is closer to the forward vehicle 200.

The rear allowance section "A" may be a distance from the host vehicle 100, as the rearward vehicle 300 positioned at the rear-side portion of the host vehicle 100 is decelerated, and may be determined through Equation 2

$$\frac{(V_X^r)^2}{2a_{max}} \qquad \text{Equation 2}$$

In this case, "$a_{max}$" may be the maximum deceleration of the smart cruise control (SCC) of the host vehicle 100

In this case, when the relative speed ($V_x^r$) of the rearward vehicle 300 is negative, since the relative distance between the rearward vehicle 300 and the host vehicle 100 is longer, the host vehicle 100 may safely change the lane. In this case, the relative speed ($V_x^r$) may not be considered in determining the rear allowance section "A".

Accordingly, to determine the rear allowance section "A", the relative speed ($V_x^r$) with respect to the rearward vehicle 300 may be considered only when the relative speed ($V_x^r$) is positive, which indicates that the host vehicle 100 is closer to the rearward vehicle 300

In addition, a front margin section "D", which is varied depending on a driver characteristic, may be formed between the host vehicle section "C" and the front allowance section "E", and a rear margin section "B", which is varied depending on the driver characteristic, may be formed between the host vehicle section "C" and the rear allowance section "A"

Referring to FIGS. 4 and 5, the driver characteristic may be indicated as the minimum distance based on a speed, which is obtained by examining a safe longitudinal headway with respect to a driver.

Accordingly, the front margin section "D" and the rear margin section "B" may be selected depending on the driver characteristic through a scheme of selecting a preset value proportional to the speed of the host vehicle 100.

For example, for persons (5%) having a superior driving ability, the front margin section "D" and the rear margin section "B" are set to be smaller values even if the speed of the host vehicle 100 is higher. Meanwhile, for persons (95%) having an inferior driving ability, the front margin section "D" and the rear margin section "B" are set to be greater values even if the speed of the host vehicle 100 is not higher.

The moving controller 110 may determine that the host vehicle 100 is able to change the lane, because of determining that a collision risk is absent, when the absolute value of the relative distance between the host vehicle 100 and the forward vehicle 200 is greater than the sum of the length of the front margin section "D" and the front allowance section "E". In addition, the moving controller 110 may determine that the host vehicle 100 is unable to change the lane, because of determining that a collision risk is present, when the absolute value of the relative distance between the host vehicle 100 and the forward vehicle 200 is shorter than the sum of the length of the front margin section "D" and the front allowance section "E".

Meanwhile, when the absolute value of the relative distance between the host vehicle 100 and the forward vehicle 200 is equal to or less than the sum of the length of the front margin section "D" and the front allowance section "E", and when only an instantaneous measurement value is used, the longitudinal length of the front allowance section "E" is significantly unclear. Accordingly, the determination regarding whether to change the lane may be improper.

Accordingly, although the absolute value of the relative distance between the host vehicle 100 and the forward vehicle 200 is equal to or less than the sum of the length of the front margin section "D" and the length of the front allowance section "E", when the relative speed between the host vehicle 100 and the forward vehicle 200 is positive, as the forward vehicle 200 is faster than the host vehicle 100, it is predicted that the absolute value of the relative distance between the host vehicle 100 and the forward vehicle 200 is greater than the sum of the length of the front margin section "D" and the length of the front allowance section "E" after a specific time is elapsed. Accordingly, the moving controller 110 may determine that the host vehicle 100 is able to change the lane.

In addition, although the absolute value of the relative distance between the host vehicle 100 and the forward vehicle 200 is equal to or less than the sum of the length of the front margin section "D" and the length of the front allowance section "E", when the relative acceleration between the host vehicle 100 and the rearward vehicle 200 is measured positive, even if the relative speed between the host vehicle 100 and the forward vehicle 200 is measured negative, as the forward vehicle 200 is slower than the host vehicle 100, the forward vehicle 200 may be accelerated to be faster than the host vehicle 100.

Accordingly, it is predicted that the absolute value of the relative distance between the host vehicle 100 and the forward vehicle 200 is greater than the sum of the length of the front margin section "D" and the front allowance section "E" after a specific time is elapsed, such that the moving controller 110 may determine that the host vehicle 100 is able to change the lane to perform lane change at the final stage.

The moving controller 110 may determine that the host vehicle 100 is able to change the lane, because of determining that a collision risk is absent, when the absolute value of the relative distance between the host vehicle 100 and the rearward vehicle 300 is greater than the sum of the length of the rear margin section "B" and the rear allowance section "A". In addition, the moving controller 110 may determine that the host vehicle 100 is unable to change the lane, because of determining that a collision risk is present, when the absolute value of the relative distance between the host vehicle 100 and the rearward vehicle 300 is shorter than the sum of the length of the rear margin section "B" and the rear allowance section "A".

Meanwhile, when the absolute value of the relative distance between the host vehicle 100 and the rearward vehicle 300 is equal to or less than the sum of the length of the rear margin section "B" and the rear allowance section "A", and when only an instantaneous measurement value is used, the longitudinal length of the rear allowance section "A" is significantly unclear. Accordingly, the determination regarding whether to change the lane may be improper.

Accordingly, although the absolute value of the relative distance between the host vehicle 100 and the rearward vehicle 300 is equal to or less than the sum of the length of the rear margin section "B" and the length of the rear allowance section "A", when the relative speed between the host vehicle 100 and the rearward vehicle 300 is negative, as the rearward vehicle 300 is slower than the host vehicle 100, it is predicted that the absolute value of the relative distance between the host vehicle 100 and the rearward vehicle 300 is greater than the sum of the length of the rear margin section "B" and the length of the rear allowance section "A". Accordingly, the moving controller 110 may determine that the host vehicle 100 is able to change the lane.

In addition, although the absolute value of the relative distance between the host vehicle 100 and the rearward vehicle 300 is equal to or less than the sum of the length of the rear margin section "B" and the length of the rear allowance section "A", when the relative acceleration between the host vehicle 100 and the rearward vehicle 300 is measured negative, even if the relative speed between the host vehicle 100 and the rearward vehicle 300 is measured positive, as the rearward vehicle 300 is faster than the host vehicle 100, the rearward vehicle 300 may be decelerated to be slower than the host vehicle 100.

Accordingly, it is predicted that the absolute value of the relative distance between the host vehicle 100 and the rearward vehicle 300 is greater than the sum of the length of the rear margin section "B" and the length of the rear allowance section "A" after a specific time is elapsed, such that the moving controller 110 may determine that the host vehicle 100 is able to change the lane to perform lane change at the final stage.

The alarm generator 150 may output an alarm sound or an alarm light in response to control of the moving controller 110.

The driving device 160 may be a motor driven power steering (MDPS), and may control lane change of the host vehicle 100 as the torque or the reactive torque is controlled by the moving controller 110. The driving device 160 may include components to substantially control the driving of the vehicle through a brake, an accelerator, a transmission, or a steering wheel.

When determining that the lane change is unable, the moving controller 110 may output an alarm sound, an alarm light, or an alarm wording to a driver by controlling the alarm generator 500. The moving controller 110 may check whether a lane is changed, after the alarm is generated. When the lane change is tried even though the alarm is generated, the moving controller 110 may control the reactive torque of the driving device 160 to perform steering assistance control, such that the host vehicle 100 is returned to the original lane.

In addition, when determining that the lane change is enable, the moving controller 110 may control the torque of the driving device 160 to perform steering assistance control and speed control to change the lane.

Hereinafter, a method for predicting a collision risk in lane change, based on a radar sensor, will be described with reference to FIG. 6 in detail according to another embodiment of the present disclosure.

Figure 6:
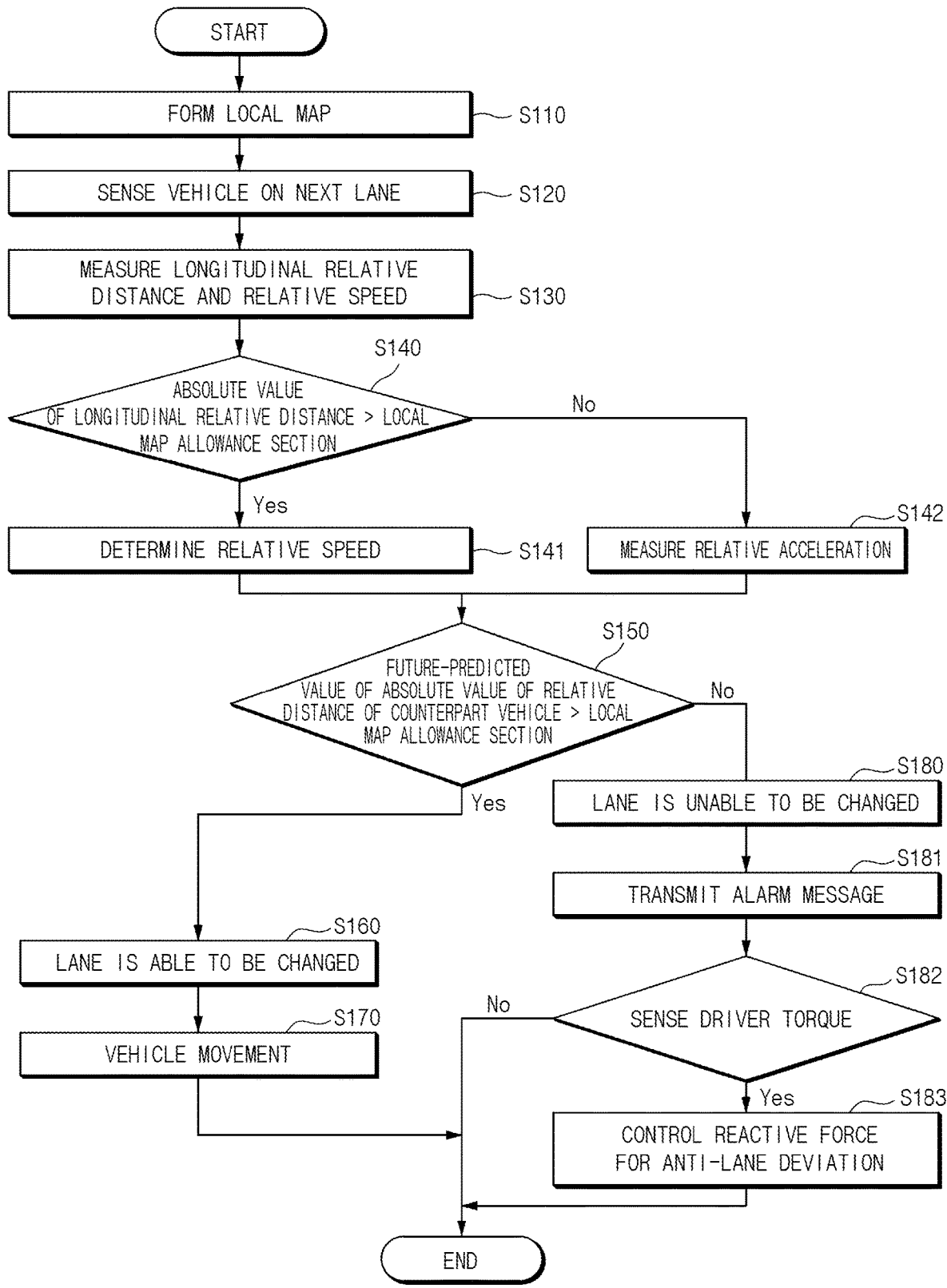
FIG. 6 is a flowchart illustrating a method for predicting a collision risk in lane change based on a radar sensor, according to an embodiment of the present disclosure.

FIG. 6 is a flowchart illustrating a method for predicting a collision risk in lane change based on a radar sensor, according to an embodiment of the present disclosure.

Hereinafter, it is assumed that the system for predicting a collision risk in lane change based on a radar sensor performs a process of FIG. 6.

First, the moving controller 110 may form the local map 190 showing spaces formed to maintain a specific distance left, right, forward, or rearward from the host vehicle 100 (S110).

Thereafter, the moving controller 110 may sense the relative speed and the relative distance with respect to the forward vehicle 200 positioned at the front-side portion of the host vehicle 100, or the relative speed and the relative distance with respect to the rearward vehicle 30 positioned at the rear-side portion of the host vehicle 100, through the radar sensors 130 provided at the front portion and the rear portion of the host vehicle 100 (S120 and S130).

Subsequently, the moving controller 110 may determine that the host vehicle 100 is able to change the lane, because of determining that a collision risk is absent, when the relative distance between the host vehicle 100 and the forward vehicle 200 is greater than the sum of the length of the front margin section "D" and the front allowance section "E". In addition, the moving controller 110 may determine that the host vehicle 100 is unable to change the lane, because of determining that a collision risk is present, when the relative distance between the host vehicle 100 and the forward vehicle 200 is shorter than the sum of the length of the front margin section "D" and the front allowance section "E".

Meanwhile, when the absolute value of the relative distance between the host vehicle 100 and the forward vehicle 200 is equal to or less than the sum of the length of the front margin section "D" and the front allowance section "E", and when only an instantaneous measurement value is used, the longitudinal length of the front allowance section "E" is significantly unclear. Accordingly, the determination regarding whether to change the lane may be improper Accordingly, although the absolute value of the relative distance between the host vehicle 100 and the forward vehicle 200 is equal to or less than the sum of the length of the front margin section "D" and the length of the front allowance section "E" (S140), when the relative speed between the host vehicle 100 and the forward vehicle 200 is positive (S141), it is predicted that the absolute value of the relative distance between the host vehicle 100 and the forward vehicle 200 is greater than the sum of the length of the front margin section "D" and the length of the front allowance section "E" after a specific time is elapsed (S150). Accordingly, the moving controller 110 may determine that the host vehicle 100 is able to change the lane (S160)

In addition, although the absolute value of the relative distance between the host vehicle 100 and the forward vehicle 200 is equal to or less than the sum of the length of the front margin section "D" and the length of the front allowance section "E" (S140), when the relative acceleration between the host vehicle 100 and the rearward vehicle 200 is measured positive, even if the relative speed between the host vehicle 100 and the forward vehicle 200 is measured negative, the forward vehicle 200 may be accelerated to be faster than the host vehicle 100 (S142).

Accordingly, it is predicted that the absolute value of the relative distance between the host vehicle 100 and the forward vehicle 200 is greater than the sum of the length of the front margin section "D" and the length of the front allowance section "E" after a specific time is elapsed (S150), such that the moving controller 110 may determine that the host vehicle 100 is able to change the lane to perform lane change at the final stage (S160 and S170).

Similarly, the moving controller 110 may determine that the host vehicle 100 is able to change the lane, because of determining that a collision risk is absent, when the absolute value of the relative distance between the host vehicle 100 and the rearward vehicle 300 is greater than the sum of the length of the rear margin section "B" and the rear allowance section "A". In addition, the moving controller 110 may determine that the host vehicle 100 is unable to change the lane, because of determining that a collision risk is present, when the absolute value of the relative distance between the host vehicle 100 and the rearward vehicle 300 is shorter than the sum of the length of the rear margin section "B" and the rear allowance section "A".

Meanwhile, when the absolute value of the relative distance between the host vehicle 100 and the forward vehicle 300 is equal to or less than the sum of the length of the front margin section "D" and the front allowance section "E", and when only an instantaneous measurement value is used, the longitudinal length of the front allowance section "E" is significantly unclear. Accordingly, the determination regarding whether to change the lane may be improper.

Accordingly, although the absolute value of the relative distance between the host vehicle 100 and the rearward vehicle 300 is equal to or less than the sum of the length of the rear margin section "B" and the length of the rear allowance section "A" (S140), when the relative speed between the host vehicle 100 and the rearward vehicle 300 is negative (S141), it is predicted that the absolute value of the relative distance between the host vehicle 100 and the rearward vehicle 300 is greater than the sum of the length of the rear margin section "B" and the length of the rear allowance section "A" after a specific time is elapsed (S150). Accordingly, the moving controller 110 may determine that the host vehicle 100 is able to change the lane (S160).

In addition, although the absolute value of the relative distance between the host vehicle 100 and the rearward vehicle 300 is equal to or less than the sum of the length of the rear margin section "B" and the length of the rear allowance section "A" (S140), when the relative acceleration between the host vehicle 100 and the rearward vehicle 300 is measured negative, even if the relative speed between the host vehicle 100 and the rearward vehicle 300 is measured positive, the rearward vehicle 300 may be decelerated to be slower than the host vehicle 100 (S142).

Accordingly, it is predicted that the absolute value of the relative distance between the host vehicle 100 and the rearward vehicle 300 is greater than the sum of the length of the rear margin section "B" and the length of the rear allowance section "A" after a specific time is elapsed (S150), such that the moving controller 110 may determine that the host vehicle 100 is able to change the lane to perform lane change at the final stage (S160 and S170).

When determining that the lane change is unable (S180), the moving controller 110 may output an alarm sound, an alarm light, or an alarm wording to a driver by controlling the alarm generator 500 (S181). The moving controller 110 may check whether a lane is changed, after the alarm is generated. When the lane change is tried even though the alarm is generated (S182), the moving controller 110 may control the reactive torque of the driving device 160 to perform steering assistance control such that the host vehicle 100 is returned to the original lane (S183).

As described above, according to the present disclosure, the collision risk may be prevented by predicting the future behavior using information on the relative distance or the relative speed with respect to the vehicle, which is positioned at the front-side portion or the rear-side portion inside the target lane, right before a host vehicle changes a lane. In addition, the accident risk may be reduced in lane change such that the lane is safely changed, by using a front radar or rear-side radar conventionally mounted, without developing an additional sensor or hardware.

Meanwhile, according to the present disclosure, the method for predicting the collision risk in lane change, based on the radar sensor is implemented in the form of a program, based on S110 to S183 and may be stored in a computer-readable recording medium.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments The scope of the present disclosure should be construed on the basis of the accompanying claims, and all the technical ideas within the scope equivalent to the claims should be included in the scope of the present disclosure.

What is claimed is:

1. A system for predicting a collision risk in lane change, the system comprising:
    radar sensors disposed at a front portion and a rear portion of a host vehicle and configured to recognize a forward vehicle positioned at a front-side portion of the host vehicle and a rearward vehicle positioned at a rear-side portion of the host vehicle, respectively; and
    a moving controller configured to:
    form a local map maintaining respective specific distances leftward, rightward, forward, and rearward from the host vehicle, and
    determine that the host vehicle is able to change a lane, when a position of the forward vehicle or a position of the rearward vehicle is absent in a section of the local map, or when the position of the forward vehicle or the position of the rearward vehicle is included in the section of the local map, and, based on a speed of the forward vehicle or a speed of the rearward vehicle, the position of the forward vehicle or the position of the rearward vehicle is predicted as being absent in the section of the local map after a specific time is elapsed, wherein the local map includes: in a direction parallel to a forward direction of the host vehicle, a host vehicle section corresponding to a total length of the host vehicle;

a front allowance section extending forward from the host vehicle section;

a rear allowance section extending rearward from the host vehicle section;

a front margin section having a length varied depending on a driver characteristic and arranged between the host vehicle section and the front allowance section; and a rear margin section having a length varied depending on the driver characteristic and arranged between the host vehicle section and the rear allowance section, and wherein the moving controller determines that the host vehicle is able to change the lane, when an absolute value of a relative distance with respect to the forward vehicle is less than or equal to a sum of a length of the front margin section and a length of the front allowance section, and when the absolute value of the relative distance with respect to the forward vehicle is predicted as being greater than the sum of the length of the front margin section and the length of the front allowance section after the specific time is elapsed, as a relative speed with respect to the forward vehicle is positive, or the relative speed with respect to the forward vehicle is negative and a relative acceleration with respect to the forward vehicle is measured positive.

2. The system of claim 1, wherein the local map further includes: in a direction perpendicular to the forward direction of the host vehicle, a forward-traveling lane section corresponding to a width of the lane on which the host vehicle travels forward;

a left lane section corresponding to a width of a left lane positioned at a left side of the forward-traveling lane section; and a right lane section corresponding to a width of a right lane positioned at a right side of the forward-traveling lane section.

3. The system of claim 2, wherein the front allowance section is a minimum stop distance for allowing the host vehicle to stop without having a collision, when the forward vehicle is braked at a maximum deceleration, and wherein the rear allowance section is a distance from the host vehicle to avoid a collision with the rearward vehicle, as the rearward vehicle is decelerated due to the host vehicle being braked at a maximum deceleration.

4. The system of claim 2, wherein the moving controller determines that the host vehicle is able to change the lane, when the absolute value of the relative distance with respect to the forward vehicle is greater than the sum of the length of the front margin section and the length of the front allowance section.

5. The system of claim 2, wherein the moving controller determines that the host vehicle is able to change the lane, when an absolute value of a relative distance with respect to the rearward vehicle is greater than a sum of a length of the rear margin section and a length of the rear allowance section.

6. A system for predicting a collision risk in lane change, the system comprising:

radar sensors disposed at a front portion and a rear portion of a host vehicle and configured to recognize a forward vehicle positioned at a front-side portion of the host vehicle and a rearward vehicle positioned at a rear-side portion of the host vehicle, respectively; and a moving controller configured to:

form a local map maintaining respective specific distances leftward, rightward, forward, and rearward from the host vehicle, and determine that the host vehicle is able to change a lane, when a position of the forward vehicle or a position of the rearward vehicle is absent in a section of the local map, or when the position of the forward vehicle or the position of the rearward vehicle is included in the section of the local map, and, based on a speed of the forward vehicle or a speed of the rearward vehicle, the position of the forward vehicle or the position of the rearward vehicle is predicted as being absent in the section of the local map after a specific time is elapsed, wherein the local map includes: in a direction parallel to a forward direction of the host vehicle, a host vehicle section corresponding to a total length of the host vehicle;

a front allowance section extending forward from the host vehicle section;

a rear allowance section extending rearward from the host vehicle section;

a front margin section having a length varied depending on a driver characteristic and arranged between the host vehicle section and the front allowance section; and a rear margin section having a length varied depending on the driver characteristic and arranged between the host vehicle section and the rear allowance section, and wherein the moving controller determines that the host vehicle is able to change the lane, when an absolute value of a relative distance with respect to the rearward vehicle is less than or equal to a sum of a length of the rear margin section and a length of the rear allowance section, and when the absolute value of the relative distance with respect to the rearward vehicle is predicted as being greater than the sum of the length of the rear margin section and the length of the rear allowance section after the specific time is elapsed, as a relative speed with respect to the rearward vehicle is negative, or the relative speed with respect to the rearward vehicle is positive and a relative acceleration with respect to the rearward vehicle is measured negative.

7. A method for predicting a collision risk in lane change, the method comprising:

forming, by a moving controller, a local map maintaining respective specific distances leftward, rightward, forward, and rearward from a host vehicle;

sensing a relative speed and a relative distance with respect to a forward vehicle positioned at a front-side portion of the host vehicle, and a relative speed and a relative distance with respect to a rearward vehicle positioned at a rear-side portion of the host vehicle, through radar sensors disposed at a front portion and a rear portion of the host vehicle; and determining, by the moving controller, that the host vehicle is able to change a lane, when a position of the forward vehicle or a position of the rearward vehicle is absent in a section of the local map, or when the position of the forward vehicle or the position of the rearward vehicle is present in the section of the local map, and based on a speed of the forward vehicle or a speed of the rearward vehicle, the position of the forward vehicle or the position the rearward vehicle is predicted as being absent in the section of the local map after a specific time is elapsed, wherein the forming a local map includes:

forming, in a direction parallel to a forward direction of the host vehicle, a host vehicle section corresponding to a total length of the host vehicle, a front allowance section extending forward from the host vehicle section and indicating a minimum stop distance for allowing the host vehicle to stop without having a collision when the forward vehicle is braked at a maximum deceleration, and a rear allowance section extending rearward from the host vehicle section and indicating a distance from the host vehicle to avoid a collision with the rearward vehicle as the rearward vehicle is decelerated due to the host vehicle being braked at a maximum deceleration; and forming a front margin section having a length varied depending on a driver characteristic and arranged between the host vehicle section and the front allowance section, and a rear margin section having a length varied depending on the driver characteristic and arranged between the host vehicle section and the rear allowance section, and wherein the determining that the host vehicle is able to change a lane includes:

determining that the host vehicle is able to change the lane, when an absolute value of a relative distance with respect to the forward vehicle is less than or equal to a sum of a length of the front margin section and a length of the front allowance section, and when the absolute value of the relative distance with respect to the forward vehicle is predicted as being greater than the sum of the length of the front margin section and the length of the front allowance section after the specific time is elapsed, as a relative speed with respect to the forward vehicle is positive, or the relative speed with respect to the forward vehicle is negative and a relative acceleration of the forward vehicle is measured positive.

8. The method of claim 7, wherein the forming a local map further includes:

forming, in a direction perpendicular to the forward direction of the host vehicle, a forward-traveling lane section corresponding to a width of the lane on which the host vehicle travels forward, a left lane section corresponding to a width of a left lane positioned at a left side of the forward-traveling lane section, and a right lane section corresponding to a width of a right lane positioned at a right side of the forward-traveling lane section.

9. The method of claim 8, wherein the determining of that the host vehicle is able to change the lane includes:

determining that the host vehicle is able to change the lane when the absolute value of the relative distance with respect to the forward vehicle is greater than the sum of the length of the front margin section and the length of the front allowance section.

10. The method of claim 8, wherein the determining that the host vehicle is able to change a lane include:

determining that the host vehicle is able to change the lane, when an absolute value of a relative distance with respect to the rearward vehicle is greater than a sum of a length of the rear margin section and a length of the rear allowance section.

11. The method of claim 8, wherein the determining that the host vehicle is able to change a lane includes:

determining that the host vehicle is able to change the lane, when an absolute value of a relative distance with respect to the rearward vehicle is less than or equal to a sum of a length of the rear margin section and a length of the rear allowance section, and when the absolute value of the relative distance with respect to the rearward vehicle is predicted as being greater than the sum of the length of the rear margin section and the length of the rear allowance section after the specific time is elapsed, as a relative speed with respect to the rearward vehicle is negative, or the relative speed with respect to the rearward vehicle is positive and a relative acceleration with respect to the rearward vehicle is measured negative.

* * * * *